United States Patent
Mehta et al.

(10) Patent No.: US 6,819,750 B1
(45) Date of Patent: Nov. 16, 2004

(54) APPARATUS AND METHOD OF ESTABLISHING FACSIMILE TRANSMISSION ACROSS A PACKET BASED NETWORK

(75) Inventors: Mehul Mehta, Potomac, MD (US); Slobodan Jovanovic, Bethesda, MD (US); Aleksandar Purkovic, Potomac, MD (US)

(73) Assignee: Nortel Networks Limited (CA)

( * ) Notice: Subject to any disclaimer, the term of this patent is extended or adjusted under 35 U.S.C. 154(b) by 839 days.

(21) Appl. No.: 09/697,221

(22) Filed: Oct. 26, 2000

Related U.S. Application Data

(60) Provisional application No. 60/176,146, filed on Jan. 14, 2000.

(51) Int. Cl.[7] .............................................. H04M 11/00
(52) U.S. Cl. ............................ 379/100.17; 379/100.06; 379/100.01; 358/434; 358/468
(58) Field of Search ........................ 379/100.01, 100.06, 379/100.05, 100.12, 100.14, 100.17, 93.08, 93.28, 93.31; 358/400, 401, 434–439, 468

(56) References Cited

U.S. PATENT DOCUMENTS 6,222,645 B1 * 4/2001 Kagawa ....................... 358/434
6,426,946 B1 * 7/2002 Takagi et al. ................ 370/252
6,574,280 B1 * 6/2003 Liau et al. .................... 375/242
6,704,399 B1 * 3/2004 Olafsson ................... 379/93.31

OTHER PUBLICATIONS

Telecommunication Industry Association, "V.34 Half Duplex Fallback to Standard Group3 V.17 Connection for T.38 Gateways" Atlanta, GA, Nov. 17–19, 1999.
International Telecommunication Union, Series V:Data Communication Over the Telephone Network, "Procedures for Starting Sessions of Data Transmission Over the Public Switched Telephone Network" V.8 Feb. 1998.

* cited by examiner

*Primary Examiner*—Wing Chan
(74) *Attorney, Agent, or Firm*—Steubing McGuinness & Manaras LLP

(57) ABSTRACT

A method and apparatus for establishing communication between a sending facsimile machine and a receiving facsimile machine first receives an answer tone message for a specified time. It then is determined if a given joint menu message has been received from the receiving facsimile machine at any time during the specified time. If it is determined that the given joint menu message has not been received from the receiving facsimile machine at any time during the specified time, then the above noted alias joint menu message is forwarded to the sending facsimile machine. The alias joint menu message is different from the given joint menu signal and thus, not a true joint menu message that can be used by the sending facsimile machine.

46 Claims, 4 Drawing Sheets

APPARATUS AND METHOD OF ESTABLISHING FACSIMILE TRANSMISSION ACROSS A PACKET BASED NETWORK

PRIORITY

This application claims priority from U.S. provisional patent application Ser. No. 60/176,146, filed Jan. 14, 2000, entitled "APPARATUS AND METHOD OF ESTABLISHING A FACSIMILE TRANSMISSION ACROSS A PACKET BASED NETWORK," the disclosure of which is incorporated herein, in its entirety, by reference.

FIELD OF THE INVENTION

The invention generally relates to facsimile transmissions and, more particularly, the invention relates to establishing a facsimile transmission across a packet based network.

BACKGROUND OF THE INVENTION

As known in the art, facsimile data commonly is transmitted across a public switched telephone network from a sending facsimile machine ("sending fax") that transmits the facsimile data, to a receiving facsimile machine ("receiving fax") that receives the facsimile data. Various facsimile protocols thus have been deployed to specify the various facets for a facsimile transmission across such a network. For example, the V.34 protocol is one of a family of related facsimile and modem protocols that may be used to specify establishment, maintenance, and termination of a facsimile connection.

The V.34 protocol borrows processes from the well known V.8 protocol to establish a facsimile connection between a sending fax and a receiving fax. Specifically, when the receiving fax answers a call from the sending fax, the V.8 protocol requires that the receiving fax initially transmit of an "answer tone message" (often referred to as "ANSAM tone") to the sending fax for a predefined amount of time. During this time, the receiving fax accumulates parameters that are common between the two fax machines for effectively transmitting and/or receiving the facsimile data. Once accumulated, the receiving fax adds the common parameters to a "joint menu" message (often referred to as a "JM message"), which subsequently is transmitted to the sending fax. Upon receipt, the sending fax uses the parameters in the JM message to transmit the facsimile data to the receiving fax.

Undesirably, various modem and facsimile protocols specify that various messages must be received by one of the two fax machines before the end of the ANSAM tone. For example, various modem and facsimile protocols require that the JM message must be received by the sending fax before the end of the predefined amount of time that the ANSAM tone is received by the sending fax (e.g., between about four to six seconds). Accordingly, problems arise when utilizing the V.34 protocol to transmit facsimile data across a packet based network (e.g., the Internet). In particular, the added delay of the packet based network can delay the transmission of the JM message from the receiving fax to the sending fax. Consequently, the sending fax may not receive a complete JM message before the end of the predefined amount of time that it is receiving the ANSAM tone. This can cause various problems that can degrade and/or terminate the connection between the sending fax and the receiving fax.

SUMMARY OF THE INVENTION

In accordance with one aspect of the invention, if a given joint menu message is not received by the end of receipt of an answer tone message, then an alias joint menu message is forwarded to a sending facsimile machine until the given joint menu message is generated and forwarded to the sending facsimile machine. To that end, a method and apparatus for establishing communication between a sending facsimile machine and a receiving facsimile machine first receives an answer tone message for a specified time. It then is determined if a given joint menu message has been received from the receiving facsimile machine at any time during the specified time. If it is determined that the given joint menu message has not been received from the receiving facsimile machine at any time during the specified time, then the above noted alias joint menu message is forwarded to the sending facsimile machine. The alias joint menu message is different from the given joint menu message and thus, not a true joint menu message that can be used by the sending facsimile machine.

In illustrative embodiments, the given joint menu message is received and forwarded to the sending facsimile machine after the given joint menu message is received. After the given joint menu message is received, the forwarding of the alias joint menu message may be terminated. The answer tone message may comply with various facsimile protocols, such as the V.X family of facsimile protocols. The answer tone message may be received from any type of network, such as a packet based network. The alias joint menu message may be repeatedly forwarded to the sending facsimile machine by a network device until the given joint menu message is received by the network device. In illustrative embodiments, the alias joint menu message indicates that the given joint menu message is forthcoming.

In accordance with other aspects of the invention, a method and apparatus of establishing facsimile communication between a first facsimile machine and a second facsimile machine receives an answer tone message for a specified time. In illustrative embodiments, the answer tone message is received over an initial facsimile connection between the first facsimile machine and the second facsimile machine. It is then determined if a given message has been received from the first facsimile machine at any time during the specified time. An alias given message is forwarded to the second facsimile machine if it is determined that the given message has not been received from the first facsimile machine at any time during the specified time. In illustrative embodiments, the alias given message has data that maintains the initial facsimile connection between the two facsimile machines.

Preferred embodiments of the invention are implemented as a computer program product having a computer usable medium with computer readable program code thereon. The computer readable code may be read and utilized by a computer system in accordance with conventional processes.

BRIEF DESCRIPTION OF THE FIGURES

The foregoing description of the invention will be appreciated more fully from the following further description thereof with reference to the accompanying drawings wherein.

DESCRIPTION OF ILLUSTRATIVE EMBODIMENTS

In illustrative embodiments of the invention, an alias message is transmitted to an appropriate facsimile machine to maintain the connection until an actual message (required by the facsimile protocol) can be transmitted. For example, in various embodiments, an alias joint menu message is transmitted to a sending facsimile machine if an actual joint menu message (utilizing one of the V.X family of facsimile or modem protocols, such as the V.8 facsimile protocol) is not received in a prespecified time. Use of the alias joint menu message thus acts as a proxy to maintain an initial facsimile connection between facsimile machines until the actual joint menu message can be transmitted to the sending facsimile machine. Maintenance of the initial facsimile connection helps to establish a true facsimile connection (i.e., a connection that permits transmission of document data). Details of this and related process are discussed below with reference to FIGS. 2–4. In a similar manner, other embodiments transmit an alias call menu message until an actual call menu message can be used. Details of this and related processes also are discussed below. It should be noted that although the discussion herein refers primarily to point-to-point facsimile connections, principles of illustrative embodiments also may be applied to broadcast facsimile transmissions.

Figure 1:
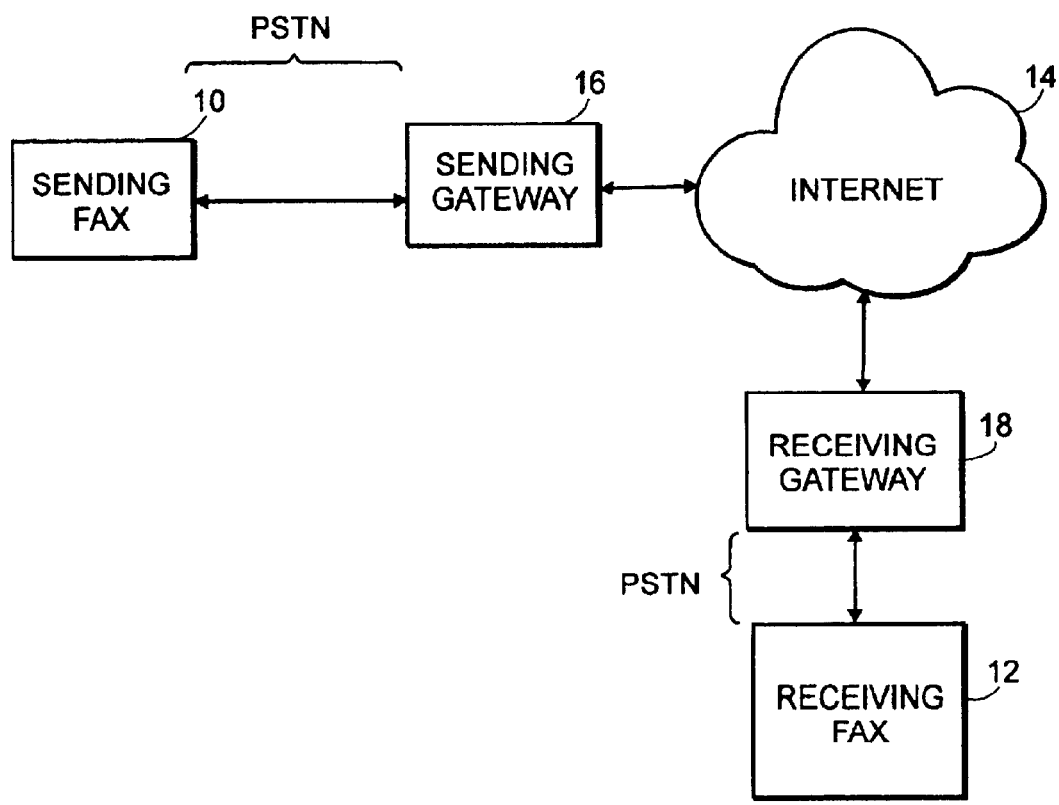
FIG. 1 shows a generalized illustrative network arrangement that may be utilized with illustrative embodiments.

FIG. 1 schematically shows an illustrative network arrangement that may be utilized to transmit facsimile data. In particular, the network includes a sending facsimile machine ("sending fax 10") that transmits facsimile data to a receiving facsimile machine ("receiving fax 12") across a packet based network 14. In the example shown, the packet based network is the Internet (referred to herein as "Internet 14"). To communicate across the Internet 14, the sending fax 10 is coupled with a sending gateway 16 across the well known public switched telephone network ("PSTN"). Accordingly, the sending gateway 16, which may be on a network device (e.g., a server), translates the circuit switched analog facsimile data received from the sending fax 10 (via the PSTN) into a packetized format (e.g., complying with the Internet Protocol) that may be transmitted across the Internet 14. The receiving fax 12 thus similarly is coupled with a receiving gateway 18, via the PSTN, to convert received facsimile data from a packetized format into an analog format. Once in an analog format, the receiving gateway 18 transmits such data to the receiving fax 12 across the PSTN.

In illustrative embodiments, both the sending gateway 16 and receiving gateway 18 are configured to process facsimile data in accord with at least one of a plurality of facsimile specifications. For example, the gateways may process facsimile data in accord with one of the well known V.X family of facsimile protocols. The term "V.X" is used herein to identify various related well known modem and facsimile protocols. Each such protocol is named with the letter "V," followed by a number. For example, the V.8 and V.34 facsimile protocols are members of the V.X family.

In a manner similar to the gateways, the sending fax 10 and receiving fax 12 also are configured to utilize the facsimile protocols of the V.X family. For additional information on the V.8 protocol, see, for example, "Procedures for starting sessions of data transmission over the public switched telephone network," which is dated Feb. 28, 1998, and is an ITU-T Recommendation published by the ITU-T Telecommunication standardization sector of the International Telecommunication Union, the disclosure of which is incorporated herein, in its entirety, by reference.

Figure 2:
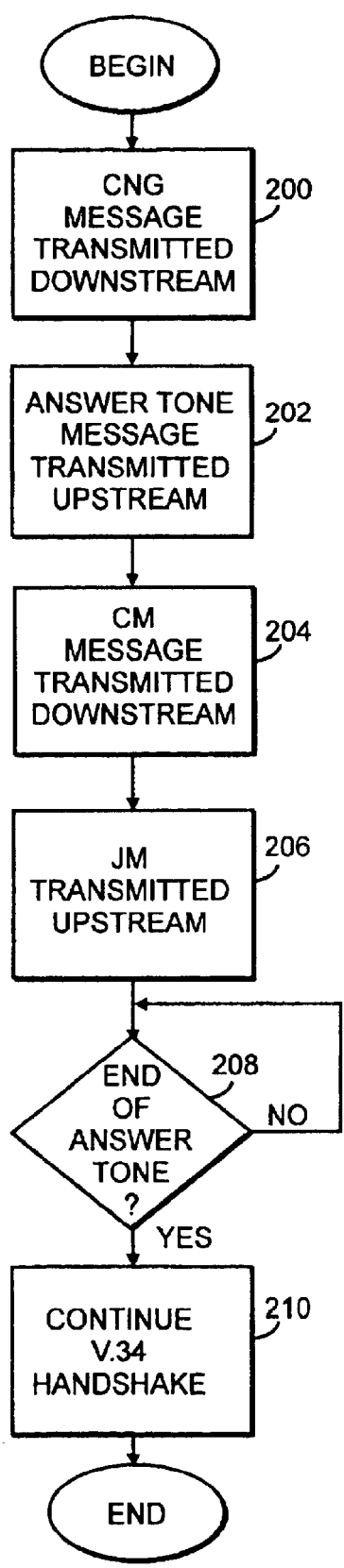
FIG. 2 shows an example of a delay-free process of establishing a facsimile connection between two facsimile machines shown in FIG. 1.

FIG. 2 shows a simplified, illustrative process of establishing a facsimile connection between the sending fax 10 and the receiving fax 12 in accord with the V.8 or the V.34 protocols. This process is described herein as an example of a connection between the sending fax 10 and receiving fax 12 that is established when the Internet 14 does not introduce significant delay to the various connection establishment messages transmitted between the faxes. Accordingly, this process does not require use of illustrative embodiments of the invention (discussed below with reference to FIGS. 3 and 4). Its discussion herein merely is to describe the conventional interaction between the sending fax 10 and the receiving fax 12 when a facsimile connection is being established in accord with the V.8 protocol. As suggested above, illustrative embodiments modify this process when the Internet 14 (or other network) introduces a significant delay into various parts of this process.

The process of FIG. 2 begins at step 200, in which a calling tone message ("CNG message") is transmitted from the sending fax 10 toward the receiving fax 12 via the gateways 16 and 18 and the Internet 14. Messages transmitted toward the receiving fax 12 are referred to as being transmitted "downstream," while messages transmitted toward the sending fax 10 are referred to as being transmitted "upstream." Receipt of the CNG message by the receiving fax 12 indicates that such signal is from a non-speech terminal (e.g., from a facsimile machine). By way of example, the V.8 protocol specifies that the CNG message is a 1100 hertz tone with 0.5 seconds of ON time, and three seconds of OFF time.

After receipt of the CNG message, the receiving fax 12 transmits an answer tone message upstream to the sending fax 10 for a predetermined amount of time as specified by one of the noted facsimile protocols (step 202). The V.8 protocol refers to an answer tone message as an "ANS" tone, while the V.34 protocol refers to the answer tone message as a modified answer tone, or an "ANSam" signal. By way of example, an ANSam signal is specified to be a sine wave signal at 2100+/−1 Hertz with phase reversals at an interval of 450+/−25 milliseconds, and amplitude modulated by a sine wave at 15+/−0.1 Hertz. The modulated envelope ranges in amplitude between (0.8+/−0.01) and (1.2+/−0.01) times its average amplitude.

In simplified terms, receipt of an answer tone message by the sending fax 10 triggers the sending fax 10 to transmit parameters that it uses for its operation to the receiving fax 12. To that end, upon receipt of the answer tone message, the sending fax 10 generates and transmits a "call menu message," with such parameters, downstream to the receiving fax 12 (step 204). The V.8 protocol specifies a call menu message "CM message" as a signal transmitted from the sending fax 10 primarily indicating modulation modes available in the sending fax 10. A CM message is a repetitive sequence of bits at 300 bits per second, modulating V.21(L), which is the low-band channel defined in the well known V.21 protocol. The CM message generally is repeatedly transmitted downstream in this manner until the sending fax 10 receives a "joint menu" message (described below) from the receiving fax 12.

Upon receipt of the CM message, the receiving fax 12 uses the data in the CM message to determine various parameters that it has in common with the sending fax 10. These common parameters then are encapsulated in a joint menu message (noted above and referred to herein as a "JM message"), which is transmitted upstream to the sending fax 10 (step 206). In illustrative embodiments, the JM message is a signal transmitted from the receiving fax 12 indicating modulation modes available jointly in both the sending fax 10 and receiving fax 12. A JM message may be a repetitive sequence of bits at 300 bits per second, modulating V.21 (H), the high-band channel defined in Recommendation V.21. The JM message may be repetitively transmitted upstream until receipt of a common mode terminator signal (discussed below and referred to herein as a "CJ signal").

V.8 specifies that by the end of an answer tone message (i.e., at which time an answer tone timeout occurs), the JM message must be received by the sending fax 10. If the JM message is not received by that time, the initial facsimile connection can disconnect (i.e., it can hang up at that time). Accordingly, it is determined at step 208 if the end of the answer tone message has been reached (i.e., if an answer tone timeout has occurred). Since this illustrative process assumes that the sending fax 10 has received the entire JM message by the time an answer tone timeout has occurred, the process continues to step 210, in which additional handshake processes are completed. In particular, upon receipt of the JM message, the sending fax 10 stops repeatedly transmitting the CM message. Instead, the sending fax 10 transmits a CJ signal (noted above) downstream to the receiving fax 12, thus indicating that the sending fax 10 has received the JM message. Upon receipt of the CJ signal, the receiving fax 12 stops repeatedly transmitting the JM message.

As suggested above, introducing the Internet 14 between the sending fax 10 and receiving fax 12 can delay receipt of the JM message by the sending fax 10. For example, the JM message may be delayed so that it is not received by the sending fax 10 before an answer tone timeout occurs. This type of delay may be considered to be significant to illustrative embodiments. Illustrative embodiments compensate for this potential delay by transmitting alias JM messages to the sending fax 10 until the actual JM message (from the receiving fax 12) is received. Details of this process are discussed with regard to FIG. 3, which shows an illustrative process of maintaining an initial facsimile connection when transmission of the joint menu message to the sending fax 10 is significantly delayed by the Internet 14. It should be noted that the term "initial connection" is used herein to represent the communication between the sending fax 10 and the receiving fax 12 while negotiating an actual facsimile connection that can transmit document data. For example, during the initial connection, the various messages described in FIG. 2 are transmitted between the two fax machines 10 and 12.

Figure 3:
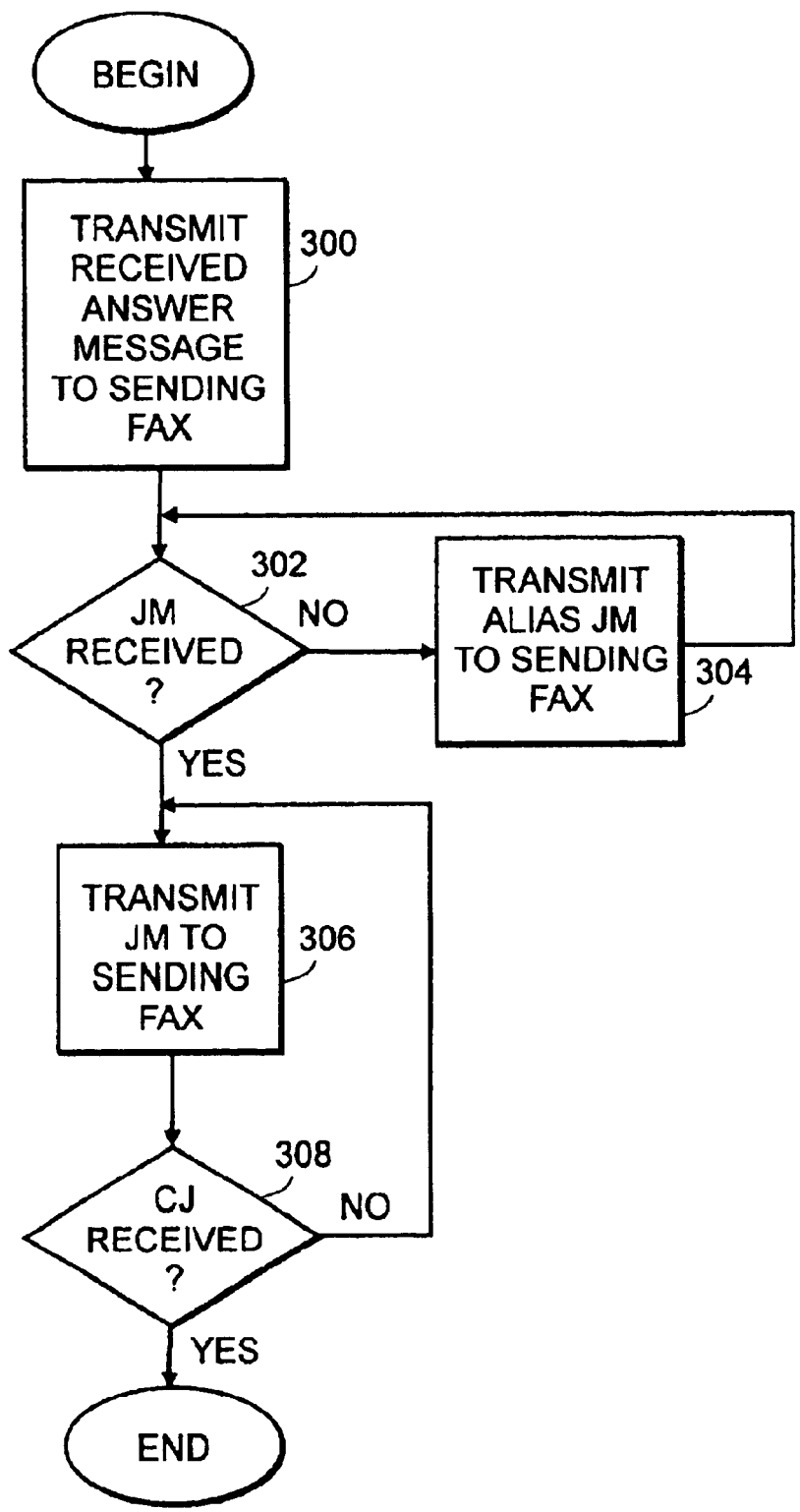
FIG. 3 shows an illustrative non-delay free process of maintaining an initial facsimile connection for a given period of time between the two facsimile machines shown in FIG. 1.

The process of FIG. 3 preferably is executed by the sending gateway 16 and thus, is discussed herein as being executed by the sending gateway 16. In alternative embodiments, the process is executed by some other network device. The process assumes that a CNG message has been transmitted to the receiving fax 12, which responsively transmits an answer tone message upstream to the sending fax 10. Accordingly, the process begins at step 300, in which the answer tone message is received by the sending gateway 16 (from the receiving fax 12 via the receiving gateway 18). The sending gateway 16 responsively converts the packetized answer tone message into an analog answer tone message, and then transmits such message to the sending fax 10 (via the PSTN) for the predefined amount of time specified by the relevant facsimile protocol.

Immediately after the predefined amount of time has elapsed (i.e., after the answer tone timeout occurs), it is determined at step 302 if the sending gateway 16 has received a joint menu message from the receiving fax 12. If no such joint menu message has been received, then the process continues to step 304, in which an alias joint menu message is transmitted by the sending gateway 16 to the sending fax 10. In illustrative embodiments, the alias joint menu message is repeatedly transmitted to the sending fax 10 until receipt of a true joint menu message from the receiving fax 12. Repeated receipt of the alias joint menu message thus stalls the initial facsimile connection at this point (e.g., on the order of a one to five seconds) until a true joint menu message is received by the sending gateway 16.

An alias joint menu message may be any message having data that maintains the initial facsimile connection between the sending fax 10 and the receiving fax 12 until the actual facsimile connection can be fully established to actually transmit facsimile data. As known in the art, if no data is received after the answer tone timeout, then the initial facsimile connection can fail. Accordingly, in illustrative embodiments, data having no meaning to the sending fax 10 may be used as an alias joint menu message. Stated another way, although it includes data that merely maintains the initial facsimile connection, the alias joint menu message preferably does not have data that can cause the sending fax 10 to perform some prespecified function. For example, the alias joint menu message preferably does not have data similar to a CJ signal (having an effect described above). The sending fax 10 thus does not require special configuration to execute illustrative embodiments.

As noted above, the alias joint menu message may be any predefined message not specified by a facsimile or modem protocol used by sending or receiving fax 10 and 12. For example, it may be required that a joint menu message is considered to be valid when two identical copies are consecutively received by the sending fax 10. Accordingly, the sending gateway 16 may generate and transmit consecutive alias joint menu messages with different bit patterns. As another example, an alias joint menu message with no data may be generated and transmitted by the sending gateway 16. In other embodiments, the alias joint menu message may include additional data.

Returning to step 302, if it is determined that a joint menu message is received by the sending gateway 16 from the receiving fax 12 (i.e., via the receiving gateway 18), then the process continues to step 306, in which the sending gateway 16 stops transmitting the alias joint menu message. Instead, the sending gateway 16 begins repeatedly transmitting the received joint menu message to the sending fax 10. It then is determined at step 308 if the sending gateway 16 has received a CJ message from the sending fax 10. If not, then the process loops back to step 306, thus causing the sending gateway 16 to continue repeatedly transmitting the joint menu message to the sending fax 10. Conversely, if the CJ message is received, then the sending gateway 16 stops transmitting the joint menu message to the sending gateway 16, thus ending the process. Conventional handshake processes then may be continued in accord with well known facsimile protocols.

Figure 4:
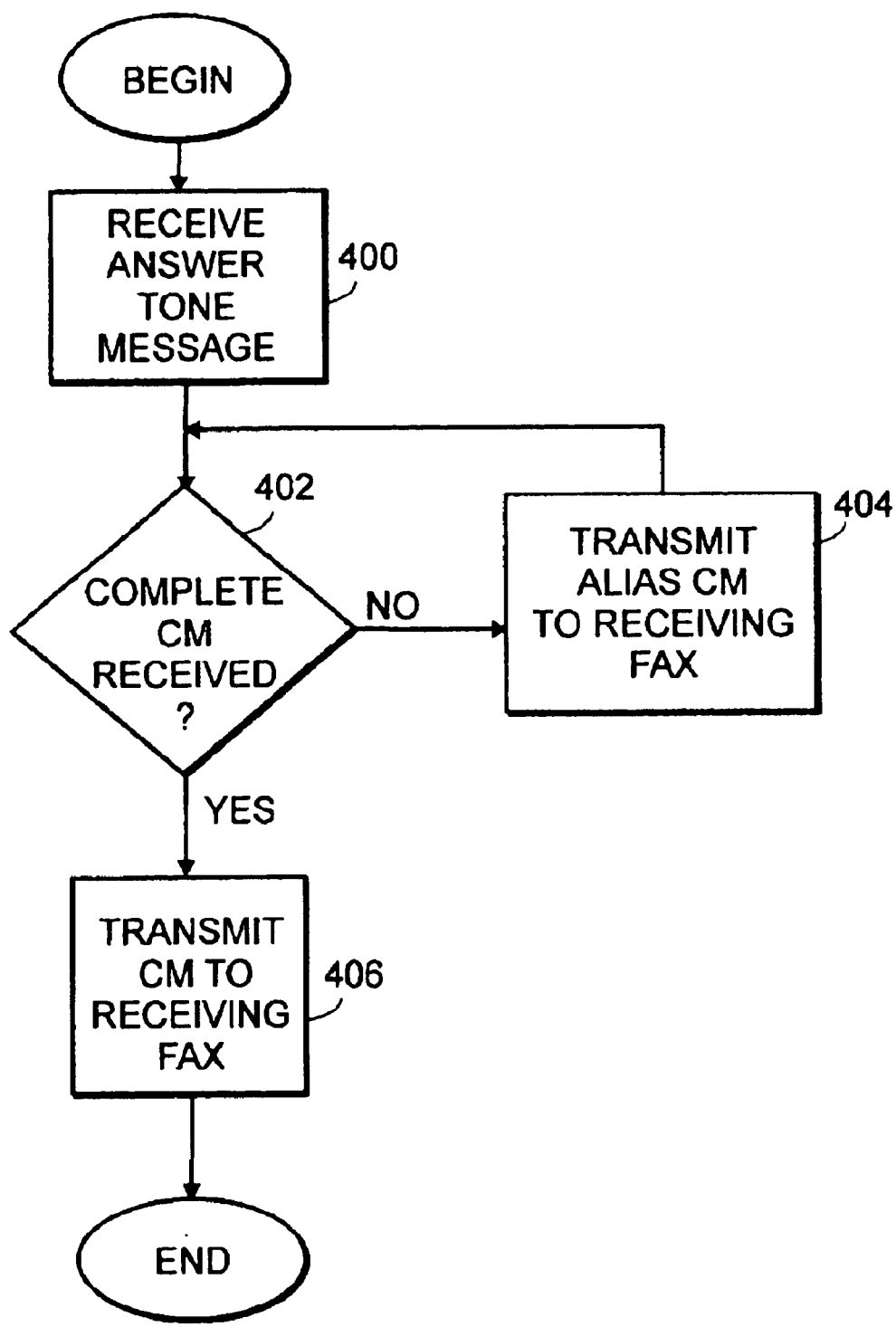
FIG. 4 shows another illustrative non-delay free process of maintaining an initial facsimile connection for a given period of time between the two facsimile machines shown in FIG. 1.

In a manner similar to the timing requirements for receipt of a JM message by the sending fax 10, the receiving fax 12 must receive a CM message before expiration of the answer tone message to maintain the initial facsimile connection. Accordingly, illustrative embodiments maintain such connection by transmitting alias CM messages to the receiving fax 12 until the actual CM message is received. FIG. 4 shows an illustrative process utilized by the receiving gateway 18 for maintaining a initial facsimile connection between the sending fax 10 and the receiving fax 12.

The process begins at step 400, in which an answer tone message is received by the receiving gateway 18 from the receiving fax 12 for a predetermined amount of time as specified by the underlying facsimile or modem protocol. Such message is forwarded by the receiving gateway 18 to the sending fax 10 through the Internet 14 and sending gateway 16. It then is determined at step 402 if a complete CM message has been received from the sending fax 10 during the predetermined time. To that end, data from the complete CM message received in packetized form from the Internet is stored in a buffer (e.g., a jitter buffer coupled with the receiving gateway 18, not shown) until such complete CM message is formed. If a complete CM message is not formed (in the buffer) during the predetermined time, then the process continues to step 404, in which an alias CM is transmitted to the receiving fax. Conversely, if a complete CM message is formed, then the process continues to step 406, in which the completely formed CM message is transmitted to the receiving fax 12.

In a manner similar to the alias JM message, the alias CM message may be any message having data that maintains the initial facsimile connection between the sending fax 10 and the receiving fax 12. Accordingly, in illustrative embodiments, data having no meaning to the receiving fax 12 may be used as an alias CM message. Stated another way, although it includes data that merely maintains the initial facsimile connection, the alias CM message preferably does not have data that can cause the sending fax 10 to perform some prespecified function. The receiving fax 12 thus does not require special configuration to execute illustrative embodiments.

Accordingly, during the process of establishing a facsimile connection, illustrative embodiments transmit alias messages to one of the facsimile machines 10 or 12 to maintain their initial facsimile connection. Stated another way, the alias messages keep the facsimile machines 10 and 12 engaged to the initial facsimile connection if the above discussed answer tone timing requirements are not met. Of course, once the actual facsimile connection is established, facsimile data (e.g., documents) may be transmitted between the sending fax 10 and the receiving fax 12.

It should be noted that although various protocols noted above, their discussion is illustrative only. For example, the V.8, V.21 and V.34 protocols were discussed as illustrative protocols that can be used with illustrative embodiments of the invention. Accordingly, various embodiments are not intended to be limited to those protocols.

Some embodiments of the invention may be implemented in any conventional computer programming language. For example, illustrative embodiments may be implemented in a procedural programming language (e.g., "C") or an object oriented programming language (e.g., "C++"). Alternative embodiments of the invention may be implemented as preprogrammed hardware elements (e.g., application specific integrated circuits and digital signal processors), or other related components.

Moreover, various embodiments of the invention may be implemented as a computer program product for use with a computer system. Such implementation may include a series of computer instructions fixed either on a tangible medium, such as a computer readable media (e.g., a diskette, CD-ROM, ROM, expansion card, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various illustrative embodiments of the invention are disclosed below, it should be apparent to those skilled in the art that various changes and modifications can be made which will achieve some of the advantages of the invention without departing from the true scope of the invention. These and other obvious modifications are intended to be covered by the claims follow.

What is claimed is:

1. A method of establishing facsimile communication between a sending facsimile machine and a receiving facsimile machine, the method comprising:

receiving an answer tone message for a specified time;

determining if a given joint menu message has been received from the receiving facsimile machine at any time during the specified time; and forwarding an alias joint menu message to the sending facsimile machine if it is determined that the given joint menu message has not been received from the receiving facsimile machine at any time during the specified time, the alias joint menu message being different from the given joint menu message.

2. The method as defined by claim 1 further comprising:

receiving the given joint menu message; and forwarding the given joint menu message to the sending facsimile machine after the given joint menu message is received.

3. The method as defined by claim 2 further comprising:

terminating forwarding of the alias joint menu message after receipt of the given joint menu message.

4. The method as defined by claim 1 wherein the answer tone message complies with the V.X family of facsimile protocols.

5. The method as defined by claim 1 wherein the answer tone message is received from the receiving facsimile machine via a packet based network.

6. The method as defined by claim 1 wherein the alias joint menu message is repeatedly forwarded to the sending facsimile machine by a network device until the given joint menu message is received by the network device.

7. The method as defined by claim 1 wherein the alias joint menu message indicates that the given joint menu message is forthcoming.

8. An apparatus for establishing facsimile communication between a sending facsimile machine and a receiving facsimile machine, the apparatus comprising:

an input module for receiving input signals, the input module being capable of receiving an answer tone message for a specified time;

a detector operatively coupled with the input module, the detector being capable of determining if a given joint menu message has been received from the receiving facsimile machine at any time during the specified time; and an output module operatively coupled with the detector, the output module forwarding an alias joint menu message to the sending facsimile machine if it is determined that the given joint menu message has not been received from the receiving facsimile machine at any time during the specified time, the alias joint menu message being different from the given joint menu message.

9. The apparatus as defined by claim 8 wherein after receipt of the given joint menu message, the output module forwards the given joint menu message to the sending facsimile machine after the given joint menu message is received.

10. The apparatus as defined by claim 9 wherein after receipt of the given joint menu signal, the output module terminates the forwarding of the alias joint menu message.

11. The apparatus as defined by claim 8 wherein the answer tone message complies with the V.X family of facsimile protocols.

12. The apparatus as defined by claim 8 wherein the answer tone message is received from the receiving facsimile machine via a packet based network.

13. The apparatus as defined by claim 8 wherein the output module repeatedly forwards the alias joint menu message to the sending facsimile machine until the given joint menu message is received by the input module.

14. The apparatus as defined by claim 8 wherein the alias joint menu message indicates that the given joint menu message is forthcoming.

15. The apparatus as defined by claim 8 wherein the output module is coupled with a switched telephone network.

16. The apparatus as defined by claim 8 wherein the sending facsimile machine includes a chassis, the output module being housed by the chassis.

17. A computer program product for use on a computer system for establishing facsimile communication between a sending facsimile machine and a receiving facsimile machine, the computer program product comprising a computer usable medium having computer readable program code, the computer readable program code comprising:

program code for receiving an answer tone message for a specified time;

program code for determining if a given joint menu message has been received from the receiving facsimile machine at any time during the specified time; and program code for forwarding an alias joint menu message to the sending facsimile machine if it is determined that the given joint menu message has not been received from the receiving facsimile machine at any time during the specified time, the alias joint menu message being different from the given joint menu message.

18. The computer program product as defined by claim 17 further comprising:

program code for receiving the given joint menu message; and program code for forwarding the given joint menu message to the sending facsimile machine after the given joint menu message is received.

19. The computer program product as defined by claim 18 further comprising:

program code for terminating forwarding of the alias joint menu message after receipt of the given joint menu message.

20. The computer program product as defined by claim 17 wherein the answer tone message complies with the V.X family of facsimile protocols.

21. The computer program product as defined by claim 17 wherein the answer tone message is received from the receiving facsimile machine via a packet based network.

22. The computer program product as defined by claim 17 further comprising program code for repeatedly forwarding the alias joint menu message to the sending facsimile machine until the given joint menu message is received by the program code for receiving.

23. The computer program product as defined by claim 17 wherein the alias joint menu signal indicates that the given joint menu message is forthcoming.

24. An apparatus for establishing facsimile communication between a sending facsimile machine and a receiving facsimile machine across a packet based network, the method comprising:

means for receiving an answer tone message for a specified time;

means for determining if a given joint menu message has been received from the receiving facsimile machine at any time during the specified time; and means for forwarding an alias joint menu message to the sending facsimile machine if the joint menu message has not been received at any time during the specified time, the alias joint menu message being different than the given joint menu message.

25. The apparatus as defined by claim 24 further comprising:

means for receiving the given joint menu message; and means for forwarding the given joint menu message to the sending facsimile machine after the given joint menu message is received.

26. The apparatus as defined by claim 25 further comprising:

means for terminating forwarding of the alias joint menu message.

27. The apparatus as defined by claim 24 wherein the answer tone message complies with the V.X family of facsimile protocols.

28. A method of establishing facsimile communication between a first facsimile machine and a second facsimile machine, the method comprising:

receiving an answer tone message for a specified time, the answer tone message being received over an initial facsimile connection between the first facsimile machine and the second facsimile machine;

determining if a given message has been received from the first facsimile machine at any time during the specified time; and forwarding an alias given message to the second facsimile machine if it is determined that the given message has not been received from the first facsimile machine at any time during the specified time, the alias given message having data that maintains the initial facsimile connection.

29. The method as defined by claim 28 wherein the alias given message is forwarded to the second facsimile machine during the specified time.

30. The method as defined by claim 28 wherein the first and second facsimile machines communicate via a protocol, the protocol specifying that the given message is to be received by the second facsimile machine during the specified time.

31. The method as defined by claim 28 wherein the given message is a joint menu message, the alias given message being an alias joint menu message.

32. The method as defined by claim 28 wherein the given message is a call menu message, the alias given message being an alias call menu message.

33. The method as defined by claim 28 further comprising:

receiving the given message; and forwarding the given message to the sending facsimile machine after the given joint menu message is received.

34. The method as defined by claim 33 further comprising:

terminating forwarding of the alias given message after receipt of the given message.

35. The method as defined by claim 28 wherein the answer tone message is received from the receiving facsimile machine via a packet based network.

36. The method as defined by claim 28 wherein the alias given message is repeatedly forwarded to the second facsimile machine by a network device until the given message is received by the network device.

37. An apparatus for establishing facsimile communication between a first facsimile machine and a second facsimile machine, the method comprising:

an input module for receiving an answer tone message for a specified time, the answer tone message being received over an initial facsimile connection between the first facsimile machine and the second facsimile machine;

a detector operatively coupled with the input module, the detector being capable of determining if a given message has been received from the first facsimile machine at any time during the specified time; and an output module operatively coupled with the detector, the output module forwarding an alias given message to the second facsimile machine if it is determined that the given message has not been received from the first facsimile machine at any time during the specified time, the alias given message having data that maintains the initial facsimile connection.

38. The apparatus as defined by claim 37 wherein the alias given message is forwarded to the second facsimile machine during the specified time.

39. The apparatus as defined by claim 37 wherein the first and second facsimile machines communicate via a protocol, the protocol specifying that the given message is to be received by the second facsimile machine during the specified time.

40. The apparatus as defined by claim 37 wherein the given message is a joint menu message, the alias given message being an alias joint menu message.

41. The apparatus as defined by claim 37 wherein the given message is a call menu message, the alias given message being an alias call menu message.

42. A computer program product for use on a computer system for establishing facsimile communication between a first facsimile machine and a second facsimile machine, the computer program product comprising a computer usable medium having computer readable program code, the computer readable program code comprising:

program code for receiving an answer tone message for a specified time, the answer tone message being received over an initial facsimile connection between the first facsimile machine and the second facsimile machine;

program code for determining if a given message has been received from the first facsimile machine at any time during the specified time; and program code for forwarding an alias given message to the second facsimile machine if it is determined that the given message has not been received from the first facsimile machine at any time during the specified time, the alias given message having data that maintains the initial facsimile connection.

43. The computer program product as defined by claim 42 wherein the alias given message is forwarded to the second facsimile machine during the specified time.

44. The computer program product as defined by claim 42 wherein the first and second facsimile machines communicate via a protocol, the protocol specifying that the given message is to be received by the second facsimile machine during the specified time.

45. The computer program product as defined by claim 42 wherein the given message is a joint menu message, the alias given message being an alias joint menu message.

46. The computer program product as defined by claim 42 wherein the given message is a call menu message, the alias given message being an alias call menu message.

* * * * *